United States Patent [19]

Schneider

[11] Patent Number: 4,911,738
[45] Date of Patent: Mar. 27, 1990

[54] ZERO-G PHASE DETECTOR AND SEPARATOR

[75] Inventor: Steven J. Schneider, Rocky River, Ohio

[73] Assignee: The United States of America as represented by the United States National Aeronautics and Space Administration, Washington, D.C.

[21] Appl. No.: 326,766

[22] Filed: Mar. 21, 1989

[51] Int. Cl.$^4$ .............................................. B01D 19/00
[52] U.S. Cl. ........................................ 55/160; 55/203; 55/204; 210/512.1; 210/97
[58] Field of Search ................... 55/18, 36, 160, 203, 55/204, 218; 210/97, 512.1

[56] References Cited

U.S. PATENT DOCUMENTS

| | | | |
|---|---|---|---|
| 2,513,992 | 7/1950 | Burns | 103/113 |
| 2,845,870 | 8/1958 | Lock | 103/113 |
| 2,960,678 | 11/1960 | Beard et al. | 73/290 V |
| 3,163,508 | 12/1964 | Tuck et al. | 55/204 |
| 3,300,950 | 1/1967 | Carle | 55/199 |
| 3,486,370 | 12/1969 | Chedeville et al. | 73/67.6 |
| 3,608,272 | 9/1971 | Di Peri et al. | 55/15 |
| 3,686,831 | 8/1972 | Libby | 55/199 |
| 3,911,726 | 10/1975 | Georgiev | 73/32 A |
| 4,080,837 | 3/1978 | Alexander et al. | 73/61.1 R |
| 4,114,439 | 9/1978 | Fick | 73/194 A |
| 4,324,569 | 4/1982 | Klinczak | 55/182 |
| 4,410,337 | 10/1983 | Gullichsen et al. | 55/203 |
| 4,541,845 | 9/1985 | Michel-Kim | 55/17 |
| 4,563,198 | 1/1985 | Houtchens | 55/41 |
| 4,656,869 | 4/1987 | Zacharias | 73/597 |
| 4,848,987 | 7/1989 | Howard et al. | 55/160 |

FOREIGN PATENT DOCUMENTS 83916 4/1986 Japan ............................. 73/290 V

*Primary Examiner*—Bernard Nozick
*Attorney, Agent, or Firm*—Gene E. Shook; James A. Mackin; John R. Manning

[57] ABSTRACT

The gaseous phase is detected and then separated from a liquid phase in a fluid. This is accomplished by centrifuging the liquid phase while the gaseous phase migrates to the axis. When the expected phase is detected at a predetermined port, a signal is generated to open the liquid or gas valve at the respective outlet ports and to modulate these valves in such a manner as to withdraw fluid at the same volume rate at which it is admitted.

14 Claims, 2 Drawing Sheets

ZERO-G PHASE DETECTOR AND SEPARATOR

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with the detection and separation of a gaseous phase from a liquid phase in a fluid. The invention is particularly concerned with detecting and separating these phases during zero-g transfer of propellants on spacecrafts.

In the past, there has been no reliable procedure to separate these phases which guarantees a single phase of the fluid would be channeled in a specified direction. In using conventional procedures a liquid could be vented overboard inadvertently, a liquid could be directed to a gaseous compressor with devastating results, or gas could be directed to a liquid pump resulting in vapor lock.

It is, therefor, an object of the present invention to provide a method and apparatus for detecting and separating gaseous and liquid phases in a fluid during zero-g transfer of propellants in space which makes certain that single phase liquid is directed to the liquid transfer pump and single phase gas is sent to the transfer compressor.

BACKGROUND ART

Lkinczak U.S. Pat. No. 4,324,569 discloses an aircraft fuel booster pump which includes centrifugal separating means. The pump separates air and vapor from liquid fuel being pumped and delivers the fuel substantially vapor-free at a desired pressure.

Houtchens U.S. Pat. No. 4,563,198 describes a method and apparatus for fluid and gas separation which is used in a non-gravity environment. The system is of the centrifugal type.

Alexander et al U.S. Pat. No. 4,080,837 is directed to metering the water content in an oil-water system by measuring sonic velocity in a flowing oil-water mixture.

These prior art devices cannot guarantee the phase of the fluid being channeled to a specific conduit because the fluids at the various outlet ports are not tested for fluid phase.

DISCLOSURE OF THE INVENTION

The general purpose of this invention is to guarantee the phase of a fluid channeled in a predetermined direction by making use of the difference in sonic velocity between the liquid and gaseous phases of the fluid to detect the phase of the fluid at each of the outlet ports of a separation device. This apparatus is of the centrifugal type in which the liquid phase is centrifuged to the periphery of the device and the gaseous phase migrates to the axis of the device. When the expected phase is detected at a predetermined port a signal is generated to open the liquid or gas valves at the respective outlet ports and to modulate these valves in such a manner as to withdraw fluid at the same volume rate at which it is admitted to the device.

BRIEF DESCRIPTION OF THE DRAWING

The objects, advantages, and novel features of the invention will be more fully apparent from the following detailed description when read in connection with the accompanying drawings wherein.

BEST MODE FOR CARRYING OUT THE INVENTION

Figure 1:
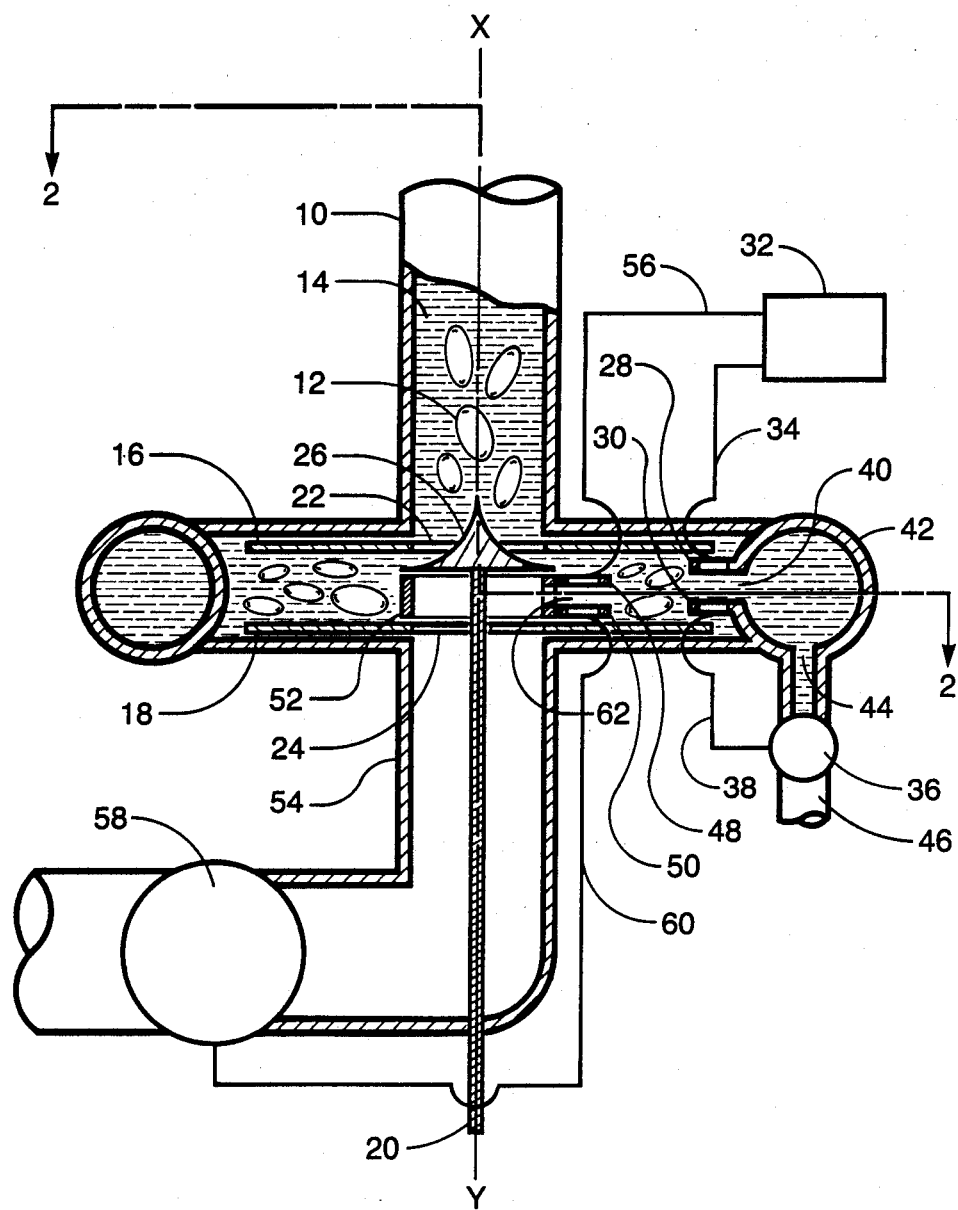
FIG. 1 is a vertical, section view of apparatus which carries out the process of the present invention.
Figure 2:
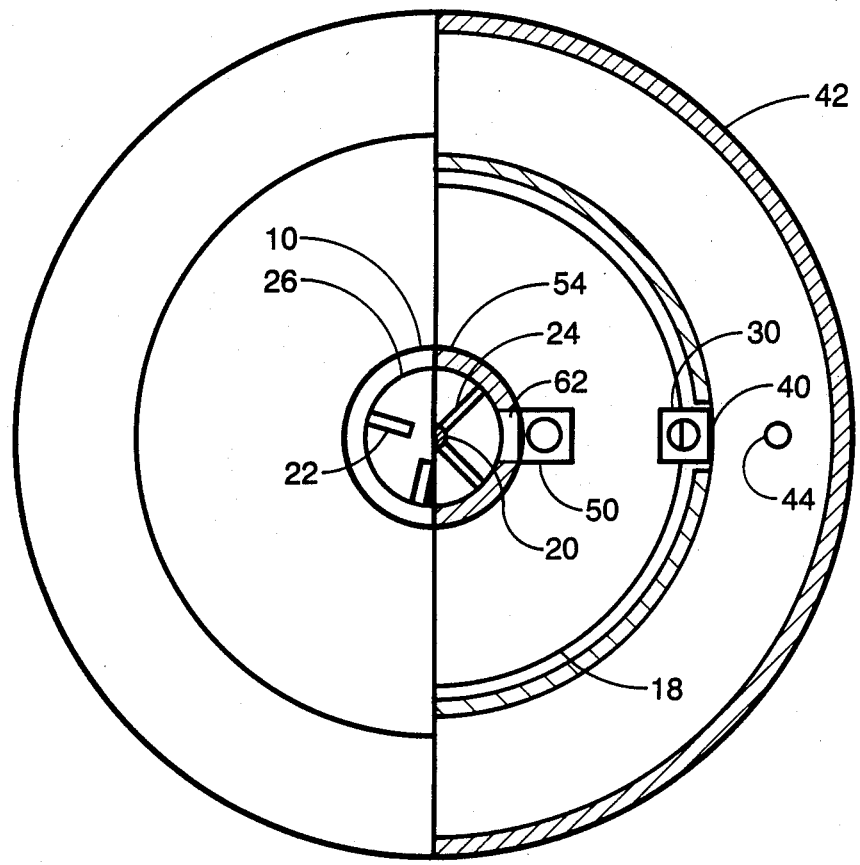
FIG. 2 is a horizontal half section view taken along line 2—2 in FIG. 1.

Referring now to the drawings, there is shown apparatus constructed in accordance with the present invention for separating a gaseous phase from a liquid phase in a fluid. The apparatus is particularly useful in zero-g scavenging of propellants from a launch propulsion system of an aerospace vehicle. The device is further useful in zero-g propellant transfer on space vehicles.

A two phase fluid, such as a cryogenic propellant, enters the inlet of a stationary conduit 10 as shown in FIG. 1. This fluid contains a gaseous phase 12 and a liquid phase 14. The two phase fluid flows through the conduit 10 to a pair of planar co-rotating circular disks 16 and 18 that are substantially parallel. These disks rotate about a normal axis X—Y as they are driven by torque applied to a drive shaft 20 from a suitable power source (not shown) through a plurality of spokes 22 and 24 connected to the disks 16 and 18 respectively.

The two phase fluid is directed by an inlet guide vane 26 to the space between the disks 16 and 18. The two phase fluid is centrifuged by the rotation of the disks 16 and 18, and the liquid phase flows in an outward direction to an acoustic transmitter 28 and an acoustic receiver 30 spaced therefrom. The transmitter is operably connected to a suitable power source 32 by a line 34.

The acoustic transmitter 28 and receiver 30 may be of the type described in U.S. Pat. No. 4,080,837. The transmitter 28 is adjacent to the outer peripheral portion of the disk 16 while the receiver 30 is adjacent to the outer peripheral portion of the disk 18.

The transmitter 28 and receiver 30 are used to detect the liquid phase by a procedure that relies on the difference in sonic velocity between the liquid and gaseous phases of the fluid. The receiver 30 is operably coupled to a control valve 36 by a line 38. The valve 36 is throttled to control the amount of liquid that passes between the transmitter 28 and receiver 30 to an intake orifice 40 in a toroidal shaped manifold 42.

In operation, when only the liquid phase is detected at the outer periphery of the rotating disks 16 and 18, the valve 36 is opened enabling liquid to be removed from the manifold 42 through an opening 44 to a pipe 46 that is connected to a liquid transfer pump (not shown). The single phase liquid passes between the transmitter 28 and receiver 30 through the orifice 40 into the manifold 42 where it is collected. The single phase liquid is withdrawn from the manifold 42 through the valve 36 in the discharge pipe 46 each time liquid only is detected at the outer periphery of the rotating disks.

Another acoustic transmitter 48 and receiver 50 adjacent to the axis X—Y of rotation of the plates 16 and 18 detects the gaseous phase of the fluid. This is accomplished by measuring the sonic velocity of the fluid between the plates and differentiating between the sonic velocity of the liquid and gaseous phases as the gaseous phase migrates towards a chamber 52 which encircles the drive shaft 20 and is supported by the manifold 42 by spokes (not shown). The chamber 52 is in communication with a discharge pipe 54 that is connected to a transfer compressor (not shown).

The transmitter 48 is connected to the power source 32 through a line 56. The receiver 50 is operably connected to a valve 58 through a line 60. This transmitter and receiver cooperate to throttle the valve 58 thereby controlling the amount of gas leaving the device through the chamber 52 and pipe 54.

In operation, when only the gaseous phase is detected at the center of the rotating disks 16 and 18, the valve 58 is opened enabling gas to be removed from the discharge pipe 54. A single phase gaseous fluid passing between the transmitter 48 and receiver 50 is directed to the chamber 52 and discharge pipe 54 through an opening 62. The inlet guide vane 26 serves to cover the upper end of the chamber 52. The single phase gaseous fluid is then discharged from the pipe 54 through the valve 58 each time gas only is detected at the center of the rotating disks.

While a preferred embodiment of the invention has been shown and described it will be appreciated that various modifications may be made to the structure and method of its operation without departing from the spirit of the invention and the scope of the subjoining claims. By way of example, it is contemplated that capacitance sensors may be used instead of the acoustic transmitters and receivers. It is further contemplated that a plurality of sensors may be utilized with corresponding orifices.

I claim:

1. Apparatus for separating a gaseous phase from a liquid phase in a fluid comprising
    rotating means for centrifuging said fluid about an axis of rotation,
    liquid sensing means at the periphery of said rotating means for detecting the liquid phase,
    first valve means for withdrawing said detected liquid phase from said fluid at the periphery of said rotating means, said first valve means being operably coupled to said liquid sensing means whereby said first valve means is opened when said liquid sensing means detects substantially all liquid,
    gas sensing means adjacent to said axis of rotation for detecting said gaseous phase, and
    second valve means for withdrawing said detected gaseous phase along said axis of rotation, said second valve means being operably coupled to said gas sensing means whereby said second valve is opened when said gas sensing means detects substantially all gas.

2. Apparatus for separating the liquid and gaseous phases from a fluid as claimed in claim 1 wherein the liquid sensing means relies on the difference in electrical capacitance between the liquid phase and the gaseous phase.

3. Apparatus for separating the liquid and gaseous phases from a fluid as claimed in claim 1 wherein the liquid sensing means relies on the difference in sonic velocities between the liquid phase and the gaseous phase of said fuid.

4. Apparatus for separating the liquid and gaseous phases from a fluid as claimed in claim 3 wherein the difference in sonic velocities between the phases is determined by an acoustic transmitter and a receiver spaced therefrom.

5. Apparatus for separating the liquid and gaseous phases from a fluid as claimed in claim 4 wherein the acoustic transmitter and spaced receiver determine the time for propagation of sound through a predetermined portion of said fluid between said acoustic transmitter and spaced receiver, and
    means for operably coupling said receiver to said first valve means whereby only said liquid phase exits the periphery of said apparatus when only liquid is detected.

6. Apparatus for separating the liquid and gaseous phases from a fluid as claimed in claim 5 wherein a plurality of acoustic transmitters and spaced receivers determine the time for sound propagation through a plurality of portions of said fluid.

7. Apparatus for separating the liquid and gaseous phases from a fluid as claimed in claim 1 wherein the gas sensing means relies on the difference in sonic velocity between the liquid phase and the gaseous phase of said fluid.

8. Apparatus for separating the liquid and gaseous phases from a fluid as claimed in claim 7 wherein the difference in sonic velocities between the phases is determined by an acoustic transmitter and a receiver spaced therefrom.

9. Apparatus for separating the liquid and gaseous phases from a fluid as claimed in claim 8 wherein the acoustic transmitter and spaced receiver determine the time of propagation of sound through a predetermined portion of said fluid between said acoustic transmitter and spaced receiver, and
    means for operably coupling said receiver to said second valve means whereby only said gaseous phase exits along the axis of rotation when only gas is detected.

10. In apparatus for separating the liquid and gaseous phases from a fluid wherein the fluid is centrifuged and the liquid phase is withdrawn through a control valve when all liquid phase is at the outer periphery of said apparatus and the gaseous phase is withdrawn inwardly of said outer periphery, the improvement comprising
    rotating means for centrifuging said fluid about an axis of rotation,
    liquid sensing means which relies on the difference in electrical capacitance between the liquid phase and the gaseous phase at the outer periphery of said apparatus for detecting the presence of liquid at said outer periphery, and
    means for operably coupling said liquid sensing means to said control valve to open the same when said liquid sensing means detects substantially all liquid.

11. In apparatus for separating the liquid and gaseous phases from a fluid wherein the fluid is centrifuged and the liquid phase is withdrawn through a control valve when all liquid phase is at the outer periphery of said apparatus and the gaseous phase is withdrawn inwardly of said outer periphery, the improvement comprising
    rotating means for centrifuging said fluid about an axis of rotation,
    liquid sensing means which relies on the difference in sonic velocities between the liquid phase and the gaseous phase of said fluid at the outer periphery of said apparatus for detecting the presence of liquid at said outer periphery, and
    means for operably coupling said liquid sensing means to said control valve to open the same when said liquid sensing means detects substantially all liquid.

12. Apparatus for separating the liquid and gaseous phases from a fluid as claimed in claim 11 wherein the difference in sonic velocities between the phases is determined by an acoustic transmitter and a receiver spaced therefrom.

13. Apparatus for separating the liquid and gaseous phases from a fluid as claimed in claim 12 wherein the acoustic transmitter and spaced receiver determine the time for propagation of sound through a predetermined portion of said fluid between said acoustic transmitter and spaced receiver, and said control valve throttles the flow of said liquid phase between said transmitter and spaced receiver whereby only said liquid phase is withdrawn at the periphery of said apparatus.

14. Apparatus for separating the liquid and gaseous phases from a fluid as claimed in claim 13 wherein a plurality of acoustic transmitters and spaced receivers determine the time for sound propagation through a plurality of portions of said fluid.

* * * * *